Patented Sept. 8, 1953

2,651,593

UNITED STATES PATENT OFFICE 2,651,593

CONCENTRATION OF AMYLOLYTIC ENZYMES

Kenneth J. Goering, Bozeman, Mont., and Victor C. Bruski, Linden, N. J., assignors to Research Corporation, New York, N. Y., a corporation of New York No Drawing. Application September 5, 1951, Serial No. 245,271

8 Claims. (Cl. 195—66)

This invention relates to the concentration of amylolytic enzymes produced by submerged cultures of various fungi.

We have discovered that by suitable adjustment of temperature and pH the amylolytic enzymes produced by fungi can be completely adsorbed on as little as 1/5 of the mycelium present in the growth medium. By elution from this mycelium a concentration of 20–40 fold can be obtained and at the same time the enzyme is separated from the contaminating carbohydrates, salts, and from over 80% of the protein present. A second adsorption will allow an additional 2–3 fold concentration.

This procedure provides a very inexpensive method of concentration, eliminating the usual methods of concentration under reduced pressure, and precipitation by alcohol or other organic solvents. Furthermore a much purer material is obtained.

According to the present invention the culture is grown under the usual conditions of forced aeration on a starch and nitrogen containing medium. When opimum amylolytic activity is obtained the culture is well mixed, about one-fifth of the total volume of fermentation liquor including a proportionate amount of mycelium is transferred to a large tank, and the balance of the mycelium is removed from the remaining fermentation liquor by screening or filtration after first adjusting the pH to 8 with NaOH. This filtrate is added to the original 1/5 volume withdrawn containing the mycelium, the pH adjusted to 5.0 with glacial acetic acid, the temperature adjusted to 37° C. and the entire mixture gently agitated for ½ hour. At the end of this time the mycelium is removed by filtration and the filtrate discarded. After washing twice with water adjusted to pH 5–6, the mycelium is resuspended in a minimum of water (1/20–1/40 original volume of the fermentation) to which has been added 0.27 pound of crystalline boric acid 0.62 pound of potassium chloride and 8.0 pounds of sodium chloride per 100 gallons of liquor. The pH is then adjusted to 8.5 with NaOH with careful stirring. After ½ hour the mycelium is removed from the extracted enzyme by filtration and a concentration of twenty to forty fold has been reached.

This process can be repeated using a concentrated amylolytic enzyme allowing a concentration of 50–120 times that in the original fermentation. The concentrated enzyme may then be sprayed on dry starch, dextrin or sugar resulting in a stable dry product having the potency of present commercial products eliminating the costly steps of evaporation, precipitation with alcohol or other organic solvents, vacuum drying and grinding. This not only results in savings in both cost of operation and equipment but the over-all recoveries are better since losses are encountered in all of the steps mentioned above.

If an even more concentrated liquor is desired the material from the second adsorption can be concentrated by vacuum distillation with no loss of activity. Since at this stage the total volume handled is only 1/100 of the original, the size of the equipment in the final step can be very small compared to the rest of the operation. With this third step concentrations of 400–600 times are readily obtained.

The principles of the invention are further illustrated by the following example:

Example

A culture medium of the following composition in the proportions indicated is advantageously used:

| | | |
|---|---|---:|
| Corn starch | per cent by weight | 1.5 |
| $KNO_3$ | do | 0.4 |
| $CaCO_3$ | do | 0.1 |
| $KH_2PO_4$ | do | 0.025 |
| $MgSO_4$ | do | .01 |
| $KCl$ | do | .01 |
| $FeSO_4 \cdot 7H_2O$ | p. p. m | .44 |
| $ZnSO_4 \cdot 7H_2O$ | p. p. m | 1.3 |
| $CuSO_4 \cdot 5H_2O$ | p. p. m | 0.22 |

10 liters of this composition is double sterilized on successive days and inoculated with a pure culture of Aspergillus oryzae. The medium is maintained at a temperature of 32–34° C. and aerated at a rate of 1/3 volume of air per volume of medium per minute. After 72–96 hours the alpha amylase activity reaches a value of from 15–40 units per ml.

After the 10 liters of fermentation liquor has reached its optimum amylase activity its pH is checked and adjusted to 8 if necessary and the mycelium removed by filtration. The mycelium is discarded except about 20% of total (50 g. containing 85% moisture). This is added to the filtrate and the pH adjusted to 5 with glacial acetic acid (10 ml.). The mixture is held at 37° C. with gentle stirring for ½ hour and the mycelium removed by filtration. The filtrate has an activity of 4.0 units/ml. compared to 15 for the original fermentation.

The mycelium is then placed in 50 ml. of borate buffer pH 8.5, 1 g. of NaCl added and the volume made up to 500 ml. Borate buffer contains 50 ml. 0.2M KCl, 50 ml. 0.2M H₃BO₃, and 8.5 ml. 0.2M NaOH, diluted to 200 ml. This mixture is gently stirred for one hour and the mycelium removed by filtration. The filtrate has an activity of 240 units per ml.

*Recoveries*

| | mg. protein per ml. | Volume (ml.) | Activity | Total units |
|---|---|---|---|---|
| Initial fermentation liquor | 0.126 | 10,000 | 15 | 150,000 |
| Filtrate after adsorption | .112 | 10,000 | 3.6 | 36,000 |
| Filtrate after elution | .372 | 500 | 240 | 120,000 |

Recovery $\frac{120,000}{150,000} \times 100 = 80\%$

Concentration $\frac{240}{15} = 16$ times

Protein removed 85%

Recoveries as high as 90% and concentrations of over 35 times have been obtained.

In general, the optimum temperature for the concentration step is from about 30° to about 40° C., and the optimum pH is about 5. The method is applicable to the concentration of amylolytic enzymes produced by the submerged culture of other fungi such as *Aspergillus niger*.

Concentrated enzyme solutions can be concentrated by the same procedure as indicated in the following table:

| | Total volume/ml. | alpha amylase, units/ml. | Kjeldahl N, mg./ml. | Total Kjeldahl N present (mg.) |
|---|---|---|---|---|
| Orig. culture liquor | 20,000 | 15 | .1475 | 2,950 |
| 1st elute | 550 | 430 | .855 | 470 |
| 2d elute | 200 | 1,000 | 1.80 | 360 |

It will be seen that a concentration of 73 times the original is obtained and that approximately 87% of the Kjeldahl nitrogen is eliminated in two adsorption and elutions.

The following example shows the suitability of further concentrating the concentrate from the foregoing table by vacuum distillation:

90 ml. of the 1100 unit material is concentrated by vacuum distillation to 14 ml. (a little more than 6 times). The concentrate has an activity of 7,000 units per ml. Recovery is 100% within the limits of experimental error on the measuring volumes of these concentrated solutions.

This procedure has the advantage that when the final evaporation step is carried out very small equipment can be used and the cost is low because the solution has already been concentrated 100 times.

We claim:

1. A method of concentrating alpha amylase produced by the submerged culture of fungi which comprises contacting the liquid portion of the culture medium with a minor portion of the mycelium of the fungus at a pH of about 5 whereby to adsorb alpha amylase from the liquor upon the mycelium, separating the mycelium from the liquid, and extracting the adsorbed alpha amylase from the mycelium with an aqueous medium at a pH of about 8.5.

2. A method of concentrating alpha amylase produced by the submerged culture of fungi which comprises contacting the liquid portion of the culture medium with about 20% of the mycelium of the fungus from the culture medium at a pH of about 5 whereby to adsorb alpha amylase from the liquor upon the mycelium, separating the mycelium from the liquid, and extracting the enzyme adsorbed alpha amylase from the mycelium with an aqueous medium at a pH of about 8.5.

3. A method of concentrating alpha amylase from the submerged culture of *Aspergillus oryzae*, which comprises contacting the liquid portion of the culture medium with a minor portion of the mycelium of the fungus at a pH of about 5 whereby to adsorb alpha amylase from the liquor upon the mycelium, separating the mycelium from the liquid and extracting the adsorbed alpha amylase from the mycelium with an aqueous medium at a pH of about 8.5.

4. A method of concentrating alpha amylase from the submerged culture of *Aspergillus oryzae*, which comprises contacting the liquid portion of the culture medium with about 20% of the mycelium of the fungus from the culture medium at a pH of about 5 whereby to adsorb alpha amylase from the liquor upon the mycelium, separating the mycelium from the liquid and extracting the adsorbed alpha amylase from the mycelium with an aqueous medium at a pH of about 8.5.

5. A method of concentrating alpha amylase from the submerged culture of *Aspergillus oryzae*, which comprises contacting the liquid portion of the culture medium with a minor portion of the mycelium of the fungus at a pH of about 5 whereby to adsorb alpha amylase from the liquor upon the mycelium and at a temperature of from about 30° to 40° C., separating the mycelium from the liquid and extracting the adsorbed alpha amylase from the mycelium with an aqueous medium at a pH of about 8.5.

6. A method of concentrating alpha amylase from the submerged culture of *Aspergillus oryzae*, which comprises contacting the liquid portion of the culture medium with a minor portion of the mycelium of the fungus at a pH of about 5 whereby to adsorb alpha amylase from the liquor upon the mycelium, separating the mycelium from the liquid and extracting the adsorbed alpha amylase from the mycelium with an aqueous sodium chloride solution at a pH of about 8.5.

7. The method defined in claim 1 wherein the enzyme is subjected to at least one further adsorption on a minor portion of mycelium at a pH of about 5 and extraction from the mycelium at a pH of about 8.5.

8. The method defined in claim 1 wherein the enzyme is subjected to at least one further adsorption on a minor portion of mycelium at a pH of about 5 and extraction from the mycelium at a pH of about 8.5 and is thereafter further concentrated by vacuum evaporation.

KENNETH J. GOERING.
VICTOR C. BRUSKI.

References Cited in the file of this patent

UNITED STATES PATENTS

| Number | Name | Date |
|---|---|---|
| 1,263,817 | Takamine | Apr. 23, 1918 |
| 1,564,385 | Waksman | Dec. 8, 1925 |

OTHER REFERENCES

Caldwell et al.: J. A. C. S. 59 (1937), pages 1835–1837.

Caldwell et al.: J. Biol. Chem. 161 (1945).